(12) United States Patent
Reynolds (10) Patent No.: US 7,706,764 B2
(45) Date of Patent: Apr. 27, 2010

(54) SYSTEMS AND METHODS FOR ACTIVE NOISE CANCELLATION IN AN RFID TAG READER

(75) Inventor: Matthew S. Reynolds, Medford, MA (US)

(73) Assignee: ThingMagic, Inc., Cambridge, MA (US)

( * ) Notice: Subject to any disclaimer, the term of this patent is extended or adjusted under 35 U.S.C. 154(b) by 998 days.

(21) Appl. No.: 11/422,075

(22) Filed: Jun. 3, 2006

(65) Prior Publication Data
US 2007/0280369 A1    Dec. 6, 2007

(51) Int. Cl.
*H04B 17/00* (2006.01)
(52) U.S. Cl. ............... 455/226.3; 455/63.1; 455/67.13; 455/226.1; 455/296
(58) Field of Classification Search ............. 455/226.3, 455/226.1, 63.1, 67.13, 296, 67.11, 114.2, 455/130, 226.2, 230, 277.2, 178.1, 283, 295, 455/303; 375/347, 267, 328, 349; 340/572.1, 340/572.4, 572.2, 10.1, 10.2, 10.5
See application file for complete search history.

(56) References Cited

U.S. PATENT DOCUMENTS

| | | | |
|---|---|---|---|
| 4,210,910 A | 7/1980 | Wohlers | |
| 4,924,210 A | 5/1990 | Matsui et al. | |
| 5,425,032 A | 6/1995 | Shloss et al. | |
| 5,537,398 A | 7/1996 | Siwiak | |
| 5,604,486 A | 2/1997 | Lauro et al. | |
| 5,990,820 A | 11/1999 | Tan | |
| 6,122,329 A | 9/2000 | Zai et al. | |
| 6,172,609 B1 | 1/2001 | Lu et al. | |
| 6,334,051 B1* | 12/2001 | Tsurumi et al. | 455/324 |
| 6,492,933 B1 | 12/2002 | McEwan | |
| 6,509,828 B2 | 1/2003 | Bolavage et al. | |
| 6,529,488 B1 | 3/2003 | Urs et al. | |
| 6,563,417 B1 | 5/2003 | Shaw et al. | |
| 6,617,962 B1 | 9/2003 | Horwitz et al. | |

(Continued)

FOREIGN PATENT DOCUMENTS

WO    WO-99/34526    7/1999

(Continued)

OTHER PUBLICATIONS

EPC Radio Frequency Identity Protocols, Class-1 Generation-2 UHF RFID, Conformance Requirements, Version 1.0.2. Feb. 2005, 40 pages.

(Continued)

*Primary Examiner*—Pablo N Tran
(74) *Attorney, Agent, or Firm*—Choate Hall & Stewart LLP; John D. Lanza (57) ABSTRACT

Systems and methods for providing active noise cancellation in an RFID tag reader are described. In one aspect, the method features increasing the signal-to-noise-plus-interference ratio of a radio frequency tag response. The method includes receiving, with a first antenna element of a radio frequency tag reader, a radio frequency tag response having a noise-plus-interference portion and a response portion, receiving a noise-plus-interference signal with a second antenna element of the radio frequency tag reader, and processing the received radio frequency tag response and the noise-plus-interference signal to increase a signal-to-noise-plus-interference ratio of the received radio frequency tag response.

38 Claims, 8 Drawing Sheets

U.S. PATENT DOCUMENTS

| | | | |
|---|---|---|---|
| 6,631,170 B1 * | 10/2003 | Gu | 375/316 |
| 6,674,327 B2 | 1/2004 | Harberts | |
| 6,735,426 B1 | 5/2004 | Pau | |
| 6,812,824 B1 | 11/2004 | Goldinger et al. | |
| 7,002,505 B2 | 2/2006 | Hughes | |
| 7,075,412 B1 | 7/2006 | Reynolds et al. | |
| 7,119,736 B2 * | 10/2006 | Heide et al. | 342/125 |
| 7,215,976 B2 * | 5/2007 | Brideglall | 455/552.1 |
| 7,227,449 B2 | 6/2007 | Bonneau, Jr. et al. | |
| 7,327,775 B1 * | 2/2008 | Gu | 375/130 |
| 7,383,025 B2 * | 6/2008 | Xuan et al. | 455/86 |
| 2002/0079741 A1 | 6/2002 | Anderson | |
| 2002/0154653 A1 | 10/2002 | Benveniste | |
| 2003/0104848 A1 * | 6/2003 | Brideglall | 455/574 |
| 2003/0214389 A1 | 11/2003 | Arneson et al. | |
| 2004/0022204 A1 | 2/2004 | Trembley | |
| 2004/0190092 A1 | 9/2004 | Silverbrook et al. | |
| 2004/0222878 A1 | 11/2004 | Juels | |
| 2005/0035849 A1 | 2/2005 | Yizhack | |
| 2005/0286660 A1 | 12/2005 | Nysen et al. | |
| 2006/0022815 A1 * | 2/2006 | Fischer et al. | 340/505 |
| 2006/0023813 A1 | 2/2006 | Jaffe et al. | |
| 2006/0186995 A1 * | 8/2006 | Wu et al. | 340/10.1 |

FOREIGN PATENT DOCUMENTS

| | | |
|---|---|---|
| WO | WO-2006/093984 A | 9/2006 |

OTHER PUBLICATIONS

International Search Report, PCT/US2006/023180, mailed on May 15, 2007.
Written Opinion of the International Searching Authority, PCT/US2006/023180, mailed on May 15, 2007.
International Preliminary Report on Patentability, PCT/US2006/023180, mailed on Jan. 17, 2008.
International Search Report from PCT/US2007/084487, mailed Sep. 3, 2008.
International Search Report, PCT/US2008/051861, mailed on Dec. 23, 2008.
Juels, A. "RFID Security and Privacy: A Research Survey" XP002375728 Retrieved from the Internet Sep. 28, 2005.
Kwak, J. et al., "RFID System with Fairness Within the Framework of Security and Privacy" XP019026267, vol. 3813, Jan. 1, 2005.
THG-004 Restriction Requirement dated Jun. 8, 2009.
THG-002 Office Action dated Feb. 5, 2009.
THG-002 Office Action dated Mar. 19, 2008.
THG-002 Office Action dated Aug. 17, 2009.
THG-002 Office Action dated Aug. 20, 2008.
THG-019: Notice of allowance for U.S. Appl. No. 10/448,053 dated Mar. 14, 2006.
Written Opinion of the International Searching Authority from PCT/US2007/084487 mailed Sep. 3, 2008.
Written Opinion of the International Searching Authority, PCT/US2006/023180, mailed on May 15, 2007.
Written Opinion of the International Searching Authority, PCT/US08/51861, mailed on Dec. 23, 2008.
THG-019 Office Action dated Oct. 31, 2005.

* cited by examiner

SYSTEMS AND METHODS FOR ACTIVE NOISE CANCELLATION IN AN RFID TAG READER

FIELD OF THE INVENTION

This application relates generally to a radio frequency identification (RFID) tag reader. More specifically, the application relates to a radio frequency identification tag reader that incorporates noise cancellation.

BACKGROUND OF THE INVENTION

In traditional RFID reader systems, each reader consists of one transmitter and one receiver. In a typical configuration, the transmitter and the receiver are attached to a multiplexer. This configuration allows for the transmitter and receiver to be connected to independently to selected antenna elements (e.g., "switched bistatic" or "multistatic" configurations). Alternatively, in a "switched monostatic" configuration a circulator or directional coupler is used to separate transmit and receive paths from one of a number of switched antenna elements. The signals received from RFID tags are coupled from the tag, through the air, to a single receiving antenna element. However, noise is also present at the receiving element and reduces the sensitivity of the reader's receiver.

There are four main sources of noise present in the reader's receiver. A first source of noise is generated by active elements in the receiver. Examples include, but are not limited to, receiver local oscillator phase noise, mixer resistive (Johnson) noise, and 1/f noise present in the receiver's baseband chain.

A second source of noise is produced in the RFID reader's transmitter section and coupled to the receiver by virtue of the finite transmit-receive isolation dependent on the chosen antenna configuration (e.g., monostatic or bistatic). This noise consists of the reader's transmitted composite noise, consisting of local oscillator phase noise, modulation DAC quantization noise, transmit modulator noise, and the noise contributions of the amplifiers needed to generate the final transmitted power.

A third source of noise is backscatter noise from external source. The backscatter noise is caused by time-varying reflections in the environment. This noise is often produced by fluorescent lighting, rotating machinery, etc, and is effectively environment dependent in nature and composition. In some instances, this noise occurs at multiples of the AC power line frequency (in the case of noise backscattered by rotating machinery) or at the high frequencies used for fluorescent lighting ballasts.

A fourth source of noise is jammer noise that is received in the receiver antenna from external transmitters, especially other RFID reader transmitters or other users of the RFID band. This noise is often the dominant contributor to the observed signal-to-noise ratio in the reader's receiver path.

SUMMARY OF THE INVENTION

In one aspect, the invention mitigates noise contributed to the RFID system by noise produced externally to the RFID system either by external backscatter noise sources or by other transmitters operating as jammers within the desired receiver bandwidth.

In one aspect, the invention features a method for increasing the signal-to-noise-plus-interference ratio of a radio frequency tag response. The method includes receiving, with a first antenna element of a radio frequency tag reader, a radio frequency tag response having a noise-plus-interference portion and a response portion, receiving a signal having mainly noise-plus-interference with a second antenna element of the radio frequency tag reader, and processing the received radio frequency tag response and the noise-plus-interference signal to increase a signal-to-noise-plus-interference ratio of the received radio frequency tag response.

In one embodiment, the method includes equalizing the received noise-plus-interference signal to generate a normalized noise-plus-interference signal response prior to processing the received radio frequency tag response. In some embodiments, the equalization occurs in the time domain. In other embodiments, the equalization occurs in the frequency domain. The equalization can occur on a periodic basis. Also, the equalization can include incorporating amplitude and phase characteristics of a second radio frequency tag reader's transmitted emission mask. In various embodiments, the emission mask is specified by an RFID protocol or measured over the air. In other embodiments, the equalization includes determining equalization coefficients using a ratiometric comparison of received signals. The comparison can occur in either the time domain or the frequency domain.

In another embodiment, the receiving includes receiving the noise-plus-interference signal with a second antenna element of the radio frequency tag reader that is switchably or permanently connected to dedicated noise-plus-interference reception circuitry or radio frequency tag response reception circuitry. In another embodiment, the receiving includes digitizing a quadrature downconverted input signal with a pair of analog to digital converters.

In some embodiments, the noise-plus-interference signal consists primarily of backscatter noise produced by time varying reflections in the environment of the tag reader or florescent lights of the environment. In another embodiment, the noise-plus-interference signal consists primarily of interfering signals transmitted by a second radio frequency tag reader.

In one embodiment, the processing is performed over the bandwidth of the radio frequency tag response. In some embodiments, the processing includes multiplying a vector containing equalization coefficients by a vector containing complex frequency bins of a Fourier transform. In other embodiments, the processing includes vector subtraction of complex frequency bins of a Fourier transform of the noise plus interference signal from the complex frequency bins of a Fourier transform of the received radio frequency tag response.

In another aspect, the invention features a radio frequency tag reading system that employs noise-plus-interference cancellation. The system includes a radio frequency tag reader and processing circuitry. The tag reader includes a plurality of antenna elements. A first one of the antenna elements receives a radio frequency tag response that includes a noise-plus-interference portion and a response portion. The ratio of response portion and the noise-plus-interference portion represents the signal-to-noise-plus-interference ratio of the received radio frequency tag response. A second one of the antenna elements receives a noise-plus-interference signal with a second antenna element of the radio frequency tag reader.

The processing circuitry is in communication with the radio frequency tag reader. The processing circuitry processes the received radio frequency tag response and the noise-plus-interference signal to increase a signal-to-noise-plus-interference ratio of the received radio frequency tag response by reducing the noise-plus-interference portion of the received radio frequency tag response using the received noise-plus-interference signal.

In yet another aspect, the invention features a radio frequency tag reading system having noise-plus-interference cancellation. The system includes means for receiving a radio frequency tag response, means for receiving a noise-plus-interference signal, and means for processing the received signals. The radio frequency tag response includes a noise-plus-interference portion and a response portion. The ratio of response portion and the noise-plus-interference portion represents the signal-to-noise-plus-interference ratio of the received radio frequency tag response. The means for processing the received radio frequency tag response and the noise-plus-interference signal increases a signal-to-noise-plus-interference ratio of the received radio frequency tag response by reducing the noise-plus-interference portion of the received radio frequency tag response using the received noise-plus-interference signal.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION

Figure 1:
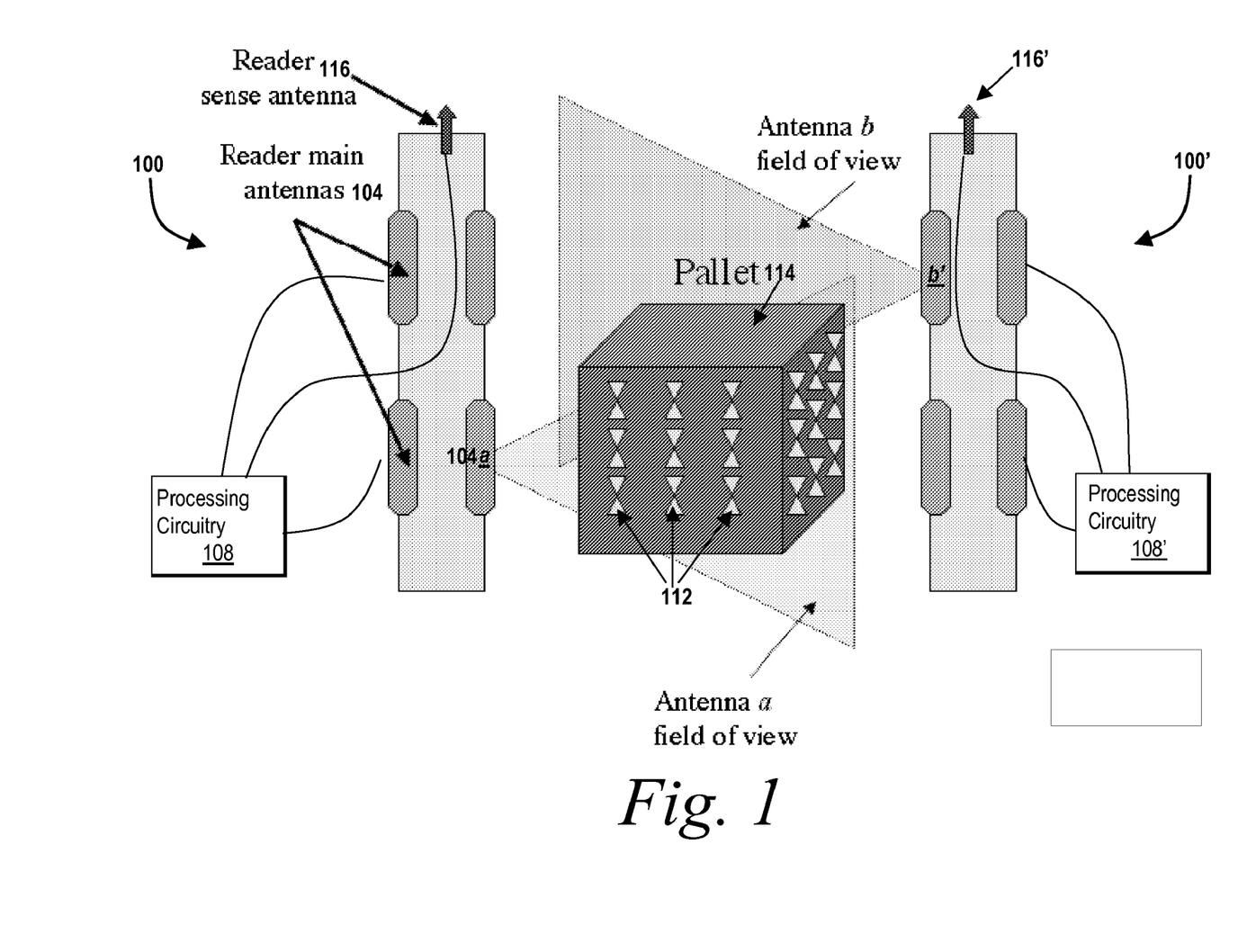
FIG. 1 depicts a block diagram of an embodiment of a RFID tag reader system.

With reference to FIG. 1, one embodiment of an RFID tag reader system 100 includes one or more antenna elements 104 in communication with processing circuitry 108. The antenna elements can be any type of an antenna element. For example, the antenna elements 104 can be, but are not limited to, patch antennas, waveguide slot antennas, dipole antennas, and the like. Each antenna element of the RFID tag reader system 100 can be the same type of elements. Alternatively, the RFID tag reader system 100 incorporates two or more different types of antenna elements 104. In some embodiments, one or more of the antenna elements 104 includes a plurality of antenna elements (i.e., an array of antenna elements). In some embodiments, the antenna elements 104 are multiplexed.

As shown in FIG. 1 in a typical installation, an additional RFID tag reader system 100' is mounted near a first RFID tag reader system 100. In operation, one or more of the antenna elements 104 receives the response signals from RFID tags 112 that are placed on items of a pallet 114. These response signals also include a noise component that is the result of the RF environment in which the RFID tag reader system 100 operates. The second tag reader system 100' also can transmit signals, which can be received by a receiving antenna element 104a. In some cases, the signals transmitted from an antenna element 104b' of the second tag reader system 100', which is located at an adjacent position to the first tag reader system 100 (e.g., an adjacent warehouse loading dock door), are coupled into the receiving antenna 104a of the reader under test 100. These transmitted signals, or "jammers", disrupt the ability of the reader under test to read the tags 112 on the pallet. In some situations, the transmitted signals from the second reader 100' may be on the order of +36 dBm effective isotropic radiated power (EIRP). These signals can have modulation and/or noise components according to a spectral mask (such as the EPC Global Class 1 Generation 2 Annex G Dense Interrogator Mode spectral mask) on the order of –29 dBm EIRP within the tag signal response band. In some instances, the response signal from an RFID tag 112 is on the order of –80 dBm EIRP. In these situations, the weak tag response signals are overpowered by the transmitted signals from the jammers.

Although shown as receiving noise from another RFID tag reader system 100', it should be understood that the noise and interference can take other forms. For example, fluorescent lights can generate RF noise and interference, as when an incident reader signal is backscattered from the periodically ionized gases in the fluorescent light. Also, the noise and interference can results from the backscattering noise produced by time varying reflection present in the environment. Also, other wireless items operating in the environment of the RFID tag reader system 100 can generate noise, such as legacy wireless LAN equipment, cordless telephones, or other industrial, scientific, or medical (ISM) devices.

As shown in FIG. 1, one embodiment of the RFID tag reader system 100 includes a sense antenna 116. The sense antenna 116 samples the local RF environment, primarily for the purpose of sampling the transmitted signals sent by "jammers" preferentially to tag response signals. In some embodiments, the sense antenna may perform this preferential reception by means of an antenna radiation pattern that favors reception of the noise source(s) over reception of tag responses. This sampled energy is transferred to a "sense receiver" that is part of the processing circuitry 108 of the RFID tag reader 100. In some embodiments, the processing circuitry 108 uses the sampled noise information extracted from the signals received by the sense antenna 116 to effectively subtract the sampled noise from the signals received by the receiving antenna 104a of the RFID tag reader 100. In one embodiment, this is accomplished using a noise rejection algorithm. As a result, a higher signal-to-noise ratio (also referred to as signal-to-noise-plus-interference ratio throughout the specification) for the desired tag response signal is generated. This, in turn, results in a lower packet error rate (PER) because of improved demodulator accuracy at the higher signal-to-noise ratio. Lower packet error rate in turn translates into improved RFID system performance, by increasing the number of tags that can be successfully read within a certain amount of time or by increasing the reliability of the tag reading operation.

In one embodiment, the sense antenna 116 is a separate antenna element that is in communication with RFID tag reader system 100. The sense antenna 116 can be collocated within the RFID tag reader system 100. The sense antenna 116 is configured to sample the local RF environment and preferentially receive signals from jammers at a higher signal level than tag response signals. The received signals can include noise and interference signals from the second RFID tag reader system 100' and other interference sources.

The sense antenna 116 can take various forms. For example, the sense antenna 116 may be an omnidirectional monopole antenna. In such an embodiment, the sense antenna 116 is separate from the other antenna elements 104 of the RFID tag reader system 100. In other embodiments, the sense antenna 116 can be, but is not limited to, patch antennas, waveguide slot antennas, dipole antennas, and the like. In essence, any type of antenna can be used as the sense antenna 116. In certain embodiments, the sense antenna element 116 need not be collocated with the reader under test. Said another way, the use of spatial diversity (e.g., antenna position) or polarization diversity can be employed to preferentially couple more noise and interference into the sense antenna 116 than tag response signal. In other embodiments, the sense antenna's radiation pattern can be configured to favor reception of noise and interference preferentially over tag responses. In addition, beam steering techniques, in the case where the sense antenna 116 is an array or a mechanically steered antenna, can be used to preferentially receive the noise-plus-interference signal from the second RFID tag reader system 100'.

In another embodiment, the sense antenna 116 is one of the antenna elements 104 of the RFID tag reader system 100 that is not in use for the tag response signal reception task. The processing circuitry 108 can include circuitry and/or software that provides the ability to switch among the antenna elements 104 which antenna element 104 is dedicated to receiving (i.e., the sense antenna 116) the noise signals from the second RFID tag reader system 100'. Said another way, in one embodiment the sense antenna 116 can be switchably connected to either dedicated noise reception circuitry or tag response reception circuitry. This can take the form of an antenna element 104 that is not selected by the reader's processing circuitry 108 but is instead selected for connection to the noise cancellation circuitry.

Figure 2:
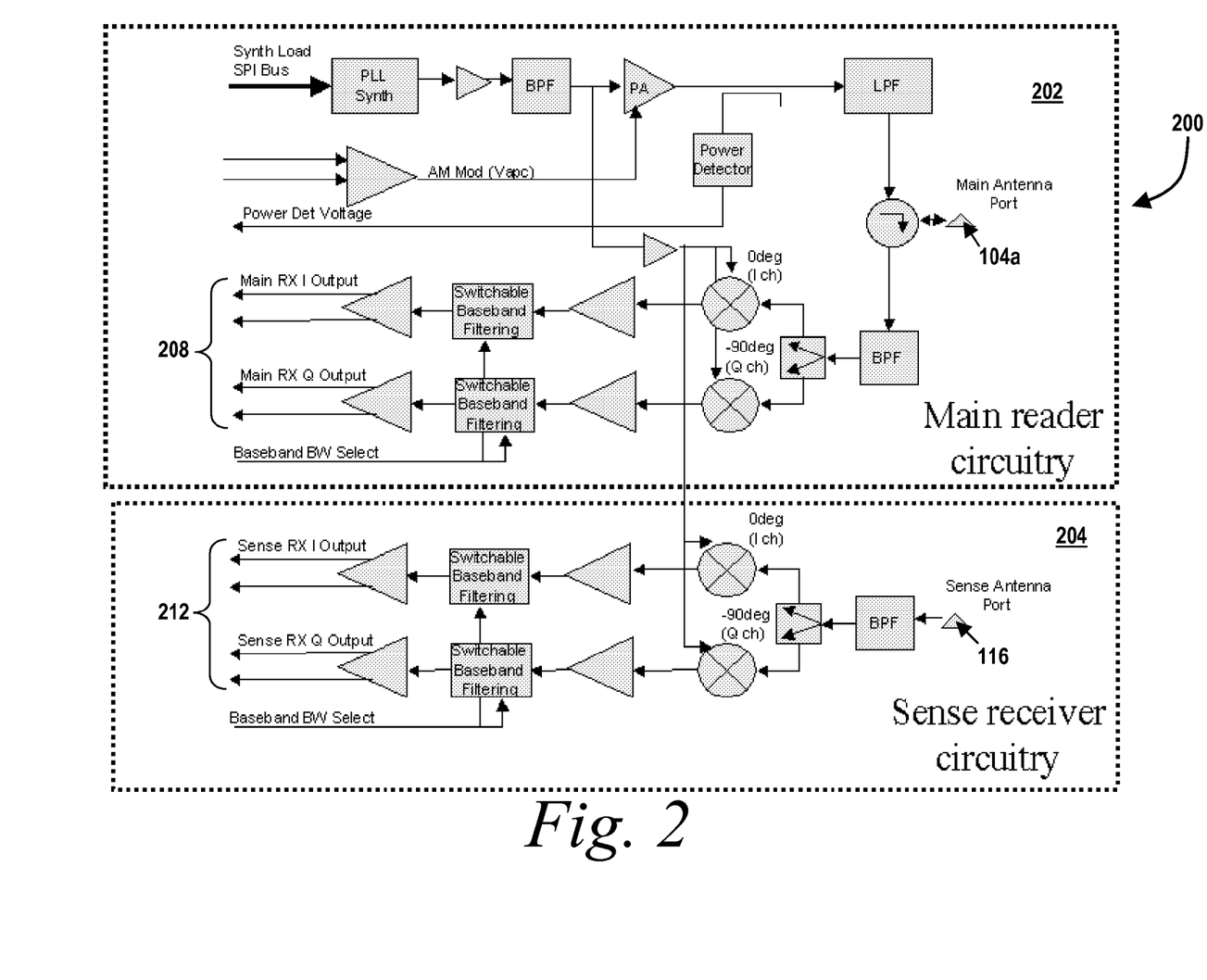
FIG. 2 depicts a block diagram of an embodiment of RFID tag reader analog circuitry.

The processing circuitry 108 of the RFID tag reader system 100 processes the received signals to increase the signal-to-noise ratio of the tag response. With reference to FIG. 2, one embodiment of the analog portion 200 of the processing circuitry 108 includes main reader (also referred to as main receiver through the specification) circuitry 202 and sense receiver circuitry 204. As shown in FIG. 2, the main reader circuitry 200 includes various components such as an in-phase demodulator, a quadrature demodulator, one or more filters, and one or more amplifiers. One or more of the various components of the main reader circuitry 200 may communicate with the sense reader circuitry 204.

In one embodiment, the sense receiver circuitry 204 includes at least some duplicate components of the main reader circuitry 200. For example, the sense receiver circuitry 204 includes duplicates of the in-phase demodulator, the quadrature demodulator, the one or more filters, and the one or more amplifiers. In a specific embodiment, the sense receiver circuitry 204 is an additional quadrature demodulator that is a replica of the main reader circuitry 200.

In one embodiment, the sense receiver circuitry 204 is driven from the same local oscillator as the main receiver circuitry 200. As such, the sense receiver circuitry 204 is tuned to the same frequency as the main reader circuitry 200. In another embodiment, the sense receiver circuitry 204 is driven from a separate local oscillator (not shown).

In operation, the sense antenna 116 and the sense receiver circuitry 204 cooperate to sample the local RF environment in which the RFID tag reader system 100 operates. The main reader circuitry 200 generates one or more received analog response signals 208 (e.g., in-phase and quadrature signals). These signals are also referred to as response signals 208 throughout the specification. In addition, the sense receiver circuitry 204 generates one or more received analog interference signals 212 (e.g., in-phase and quadrature signals). These signals are also referred to as noise-plus-interference signals.

Further, the sense receiver circuitry 204 cooperates with a digital circuit 300 described below in connection with FIG. 3 to convert a desired bandwidth, which preferably includes the bandwidth of the tag responses, to a digitized baseband signal for further processing. For example, the digitized sense receiver signal is used in cooperation with a digitized main reader circuitry signal to increase the signal-to-noise ratio of the tag responses.

Figure 3:
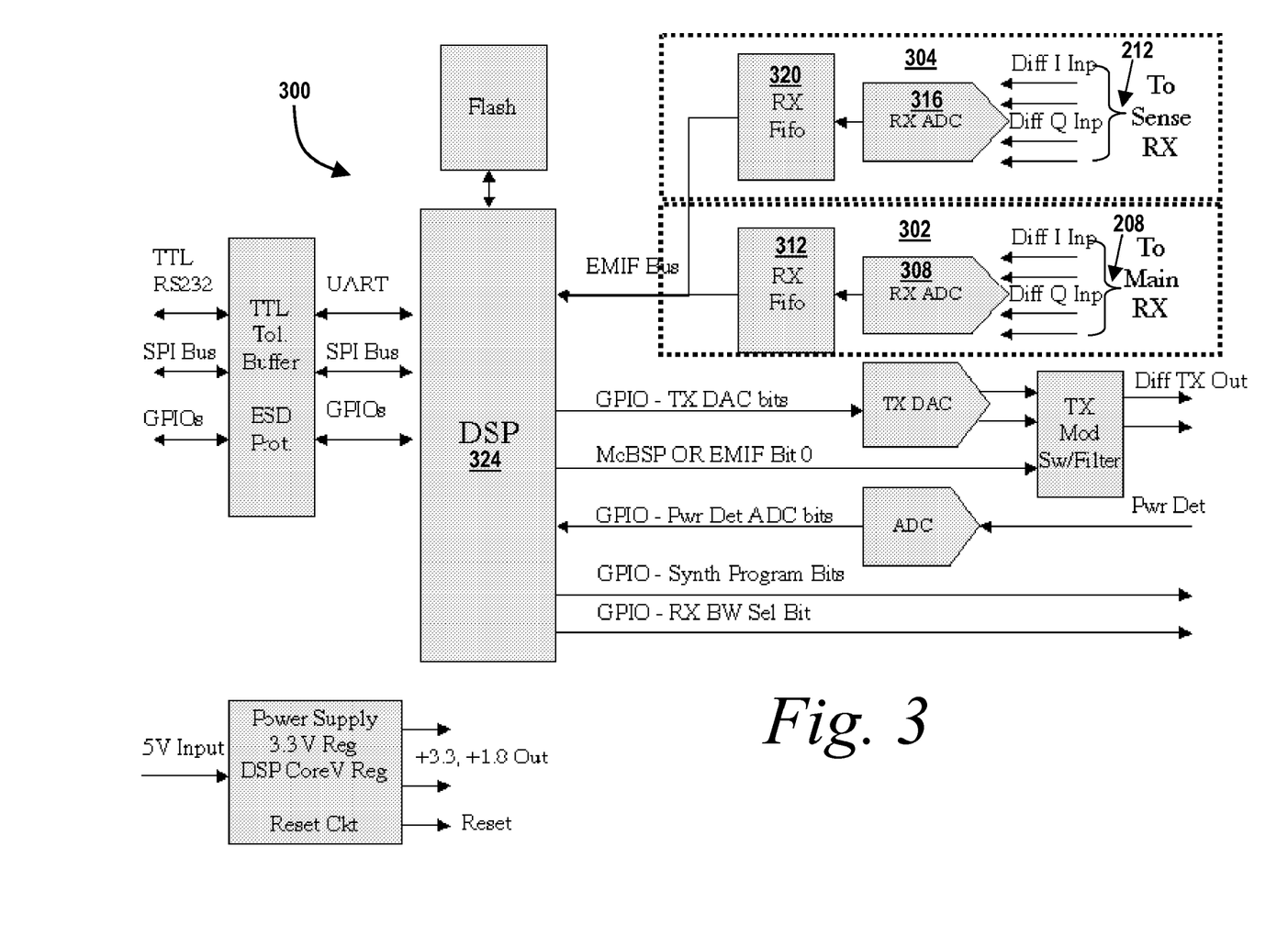
FIG. 3 depicts a block diagram of an embodiment of RFID tag reader digital circuitry.

With reference to FIG. 3, one embodiment of the digital portion 300 of the processing circuitry 108 is shown and described. The digital portion 300 includes a main digital receiver section 302 and sense digital receiver section 304. In one embodiment, the main digital receiver section 302 includes an analog to digital converter 308 (RX ADC) in communication with to the main reader circuitry 202 of FIG. 2 that receives the analog response signals 208 from the main reader circuitry 202. The RX ADC 308 is also communicates with a first-in-first-out (RX FIFO) memory 312. Although shown as having a single ADC 308, other embodiments can include additional RX ADCs 308 can be used. For example, each of the in-phase signal and quadrature signals can be fed into a respective ADC 308. Also, additional FIFO memories 312 can be used to store each of the respective digitized signals.

The sense digital receiver section 304 includes an analog to digital converter 316 (RX ADC) that communicates with the main reader circuitry 204 of FIG. 2 to receive the analog noise-plus-interference signals 212 from the main reader circuitry 204. The RX ADC 316 is communicates with a first-in-first-out (FIFO) memory 320. Although shown as having a single RX ADC 308, it should be understood that additional RX ADCs 308 can be used. For example, each of the in-phase signal and quadrature signals can be fed into a respective RX ADC 308. Also, additional FIFO memories 320 can be used to store each of the respective digitized signals.

In operation, once the sense antenna signals 212 and the reader antenna signals 208 are received and digitized, the digitized signals are communicated to a digital signal processor (DSP) 324. In some embodiments, the DSP periodically access the FIFO memories, retrieves the digitized signals, and processes the digital signals. One or more known noise rejection algorithms are applied to the digitized signals by the DSP 324 to increase the signal-to-noise ratio of the tag responses.

Figure 4:
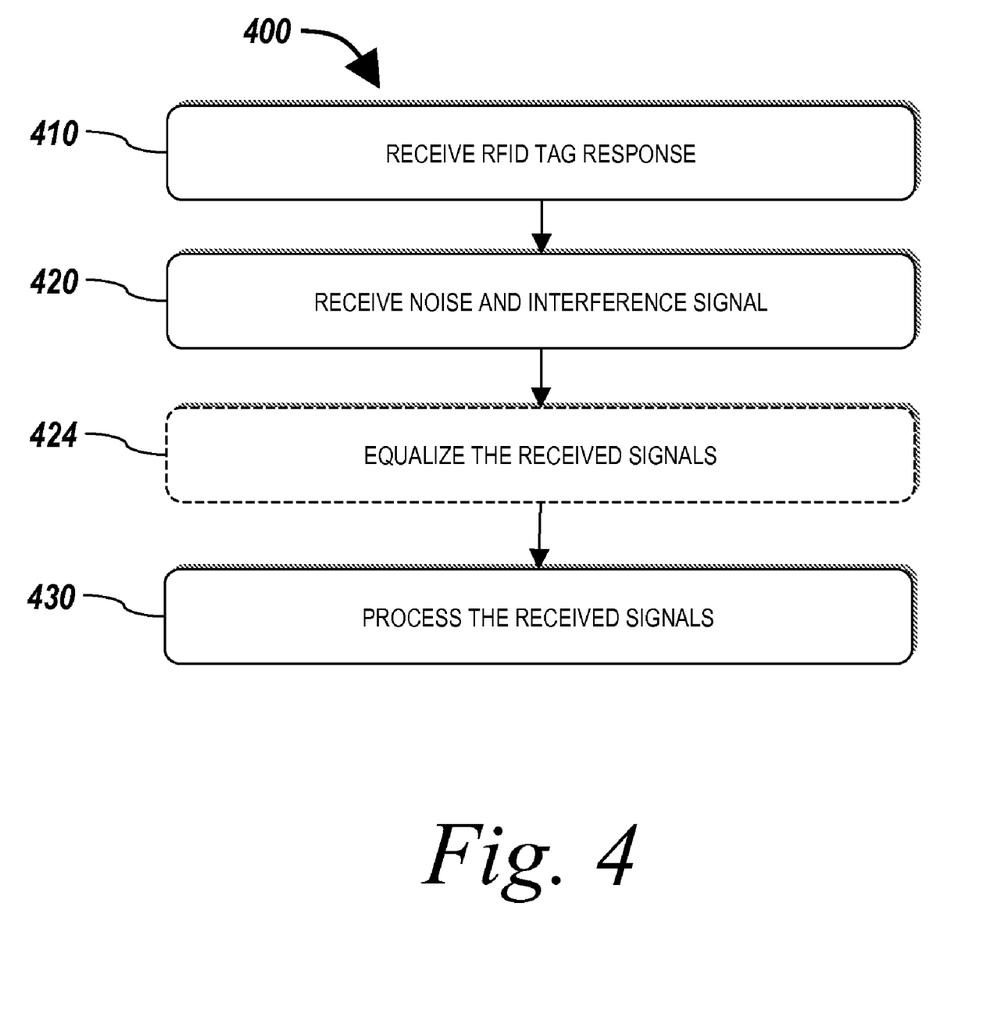
FIG. 4 is a flow chart of an embodiment of a method of providing noise cancellation in a RFID tag reader.

With reference to FIG. 4, an embodiment of a method 400 of increasing the signal-to-noise-plus-interference ration of an RFID tag response includes receiving (STEP 400) a radio frequency tag response, receiving (STEP 420) a noise-plus-interference signal, and processing (STEP 430) the received radio frequency tag response and the noise-plus-interference signal to increase the ratio between the two signals. In some embodiments, the received tag responses and noise-plus-interference signals are equalized (STEP 424, shown in phantom) before they are processed.

As previously described, one or more antenna elements 104 receives (STEP 410) the RFID tag response. In one embodiment, the antenna element 104 receives (STEP 410) the tag response in the near field. In another embodiment, the antenna element 104 receives (STEP 410) the tag response in the far field. In one embodiment, the received tag responses are represented as a quadrature downconverted signal that is, in turn, digitized. In some embodiments, the tag response signals are received (STEP 140) in near real-time after being irradiated by a tag reader system 100 transmission. In other embodiments, the response signals are received (STEP 140) at some time after irradiation. For example, some RFID tags can include capacitors that store the irritated energy, which can be used for processing if the RFID tag also includes a processing elements and subsequent transmission locally processed data to the receiving antennas 104.

The sense antenna 116 receives (STEP 420) the noise-plus-interference signal. In one embodiment, a dedicated antenna element is added to the RFID tag reader system 100 and is configured to preferentially receive the noise-plus-interference signal that results from the operational environment. In another embodiment, the sense antenna 116 is one of the antenna elements 104 that are not used to receive the tag response signals. The sense antenna receives (STEP 420) the noise-plus-interference signal in either the near field or the far field. The received noise-plus-interference is communicated to the dedicated noise-plus-interference reception circuitry for processing.

The processing circuitry 108 processes (STEP 430) the received tag response signals and noise-plus-interference signals. In one embodiment, the processing includes applying a noise cancellation algorithm to the received signals. Examples of noise cancellation algorithms can include, but are not limited to, a least mean square (LMS) algorithm or a recursive least squares (RLS) algorithm. These algorithms typically take the form of an adaptive weighting of a sampled noise-plus-interference signal which is subtracted from a received tag signal.

In another embodiment, the method 400 optionally includes equalizing (STEP 424) the received signals prior to processing the received signals. The equalization can be performed on a periodic basis or continually depending on the processing capabilities of the processing circuitry 108. The equalization can be performed using at least one or more of the various techniques described below, although other techniques that are not described can also be used.

In one embodiment, the equalization (STEP 424) operation is performed to equalize the amplitude and phase response of the analog sense receiver circuitry 204 and digital sense receiver circuitry 304 with respect to the analog main reader circuitry 202 and digital main reader circuitry 302. This operation is not continuously performed; instead it is periodically performed at an interval sufficient to compensate for changes in RF path lengths or antenna element 104 behavior caused by RFID tag reader system 100 component drift, mechanical changes to the RFID tag reader system 100 configuration, or due to the movement of reflective objects in the near and far fields of the RFID tag reader system 100. In one embodiment, the equalization process is performed at time intervals when the tags 112 are known not to be responding (e.g., during intervals when the transmitter of the reader under test is off).

Figure 5:
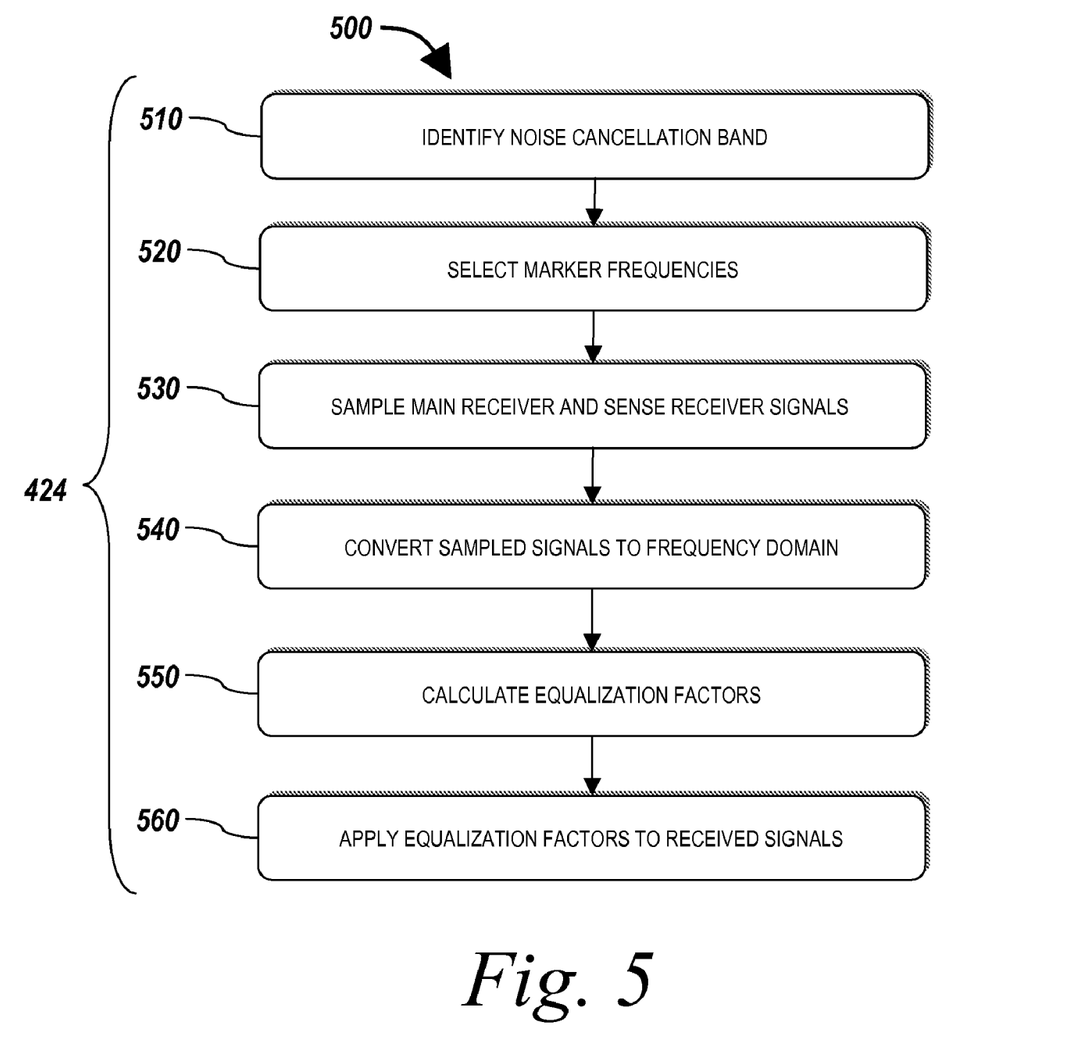
FIG. 5 is a flow chart of an embodiment of a method of determining equalization coefficients that are used by a noise cancellation algorithm.

With reference to FIG. 5, one particular embodiment of a method 500 of equalizing (STEP 424) the received signals is shown and described. The method includes identifying (STEP 510) the noise cancellation band, selecting (STEP 520) marker frequencies, and sampling (STEP 530) the main receiver and sense receiver signals. The method also includes converting (STEP 540) the sampled signals from the time domain to the frequency domain, calculating (STEP 550) equalization factors, and applying (STEP 560) the equalization factors to the received signals.

In one embodiment, during configuration of the RFID tag reader system 100 a technician or end-user identifies (STEP 510) the desired noise cancellation band and configures the RFID tag reader system accordingly. This desired cancellation band may be chosen on the basis of a measurement of a noise and interference profile in a particular spatial region. The noise cancellation band may be selected to achieve cancellation of the noise or interference generated by a particular type of RFID reader or RFID reader waveform, or intermodulation distortion produced by nonlinearities causing mixing between two RFID reader signals. The nonlinear mixing may take place in an RFID reader's receiver circuitry or in another nonlinear element of the system. In other embodiments, the noise cancellation band may be selected to cancel another source of noise or interference such as cellular telephone signals or intermodulation distortion caused by cellular telephone, paging, or mobile radio communication signals that would otherwise interfere with tag reading. In various embodiments, the system may be configured by communicating system settings via a network connection from a central server to a network of readers, or manually by interaction with each reader's settings web page individually.

In other embodiments, the noise cancellation setup is done automatically and can be continuously changed and updated. In one embodiment, the tag response subcarrier band for a particular RFID tag protocol or group of protocols is the desired noise cancellation band. In one embodiment, which is particularly beneficial in the case of EPC Global Class 1 Generation 2 RFID tags operating in the Miller m=4 256 KHz carrier configuration, this cancellation band is between about 200 kHz-300 kHz. In another embodiment, the desired noise cancellation band is between about 18 kHz-100 kHz, which correspond to traditional fluorescent lights and ballasts excitation frequencies. In some embodiments the noise cancellation setup may be controlled by a scheduler that interleaves various operating modes (such as RFID tag protocol, operating frequency, data rates, modulation types, etc), so that the noise cancellation setup is chosen to automatically correspond to those settings offering improved performance for the selected operating mode.

In one embodiment, the technician selects (STEP 520) one or more marker frequencies within the noise cancellation band. In another embodiment, marker frequencies are selected from a table or dynamically computed to correspond to the desired operating mode. For example, four discrete frequencies that are equally spaced within the noise cancellation band can be used. In other examples, more or less frequencies can be used. Also, it should be understood that the frequencies need not be equally spaced. In some embodiments, marker frequencies are chosen to be particularly closely spaced in frequency bands that contain more noise power, or frequency bands in which the reader's data demodulator is particularly sensitive to interference. In some embodiments, the marker frequencies receive preferential noise cancellation so the marker frequencies may be chosen on that basis. The identified marker frequencies are used, as described below, to generate equalization coefficients for both amplitude and phase.

The processing circuitry samples (STEP 530) both the main receiver signals and the sense receiver signals. In one embodiment, this sampling occurs simultaneously for a given interval of time. In other embodiments, the sampling occurs on an alternating basis between the receivers for a given interval of time. In one embodiment, 12,500 samples of 14 bit resolution are taken for the main receiver and sense receiver in-phase and quadrature channels at a sampling rate of 4 Msa/sec. In this embodiment, the sampling duration is 3.125 milliseconds. In other embodiments, different sampling rates, durations, and sampling resolutions can be used.

In one embodiment, the processing circuitry 108 converts (STEP 540) the signals from the time domain to the frequency domain. In one embodiment, a complex valued fast Fourier transform (FFT) is performed for the each of the main and sense receiver sampled data sets. In another embodiment, a discrete Fourier transform is used. It should be understood that other time domain to frequency domain conversions can be used, such as any of the family of Hadamard transforms or z-transforms. A wavelet method may also be used as part of a wavelet domain embodiment of the invention.

In one embodiment, the processing circuitry 108 calculates (STEP 550) an equalization factor for both phase and amplitude. In one implementation, an FFT response bin (e.g., frequency) is identified that corresponds to one of the previously identified marker frequencies of the noise cancellation band. After identifying the corresponding noise cancellation samples and the received signal samples, the magnitude and phase of the main receiver and sense receiver responses are compared within that bin. For example, within the FFT bin corresponding to a certain frequency fi the main receiver FFT shows a response magnitude of $M_1$ and a phase of $Phi_1$. At that same frequency, the sense receiver shows a response magnitude of $M_2$ and a phase of $Phi_2$. A magnitude and phase subtraction is then performed to find magnitude and phase equalization factors or coefficients $CM_1=M_1-M_2$, $CP_1=Phi_1-Phi_2$. Magnitude and phase equalization coefficients are then determined for each of the marker frequency within the noise cancellation band.

Although described as deriving the equalization coefficients in the frequency domain, in other embodiments the derivation of the equalization coefficients can also be performed in the time domain. In some embodiments such a least mean squares (LMS) implementation, the equalization may be performed by adjusting the equalization coefficients in order to minimize the mean square error between the desired output signal and the noisy input signal. In some embodiments, this adjustment is performed as a recursive process on a time series of tag response signals and sense receiver signals.

Figure 6:
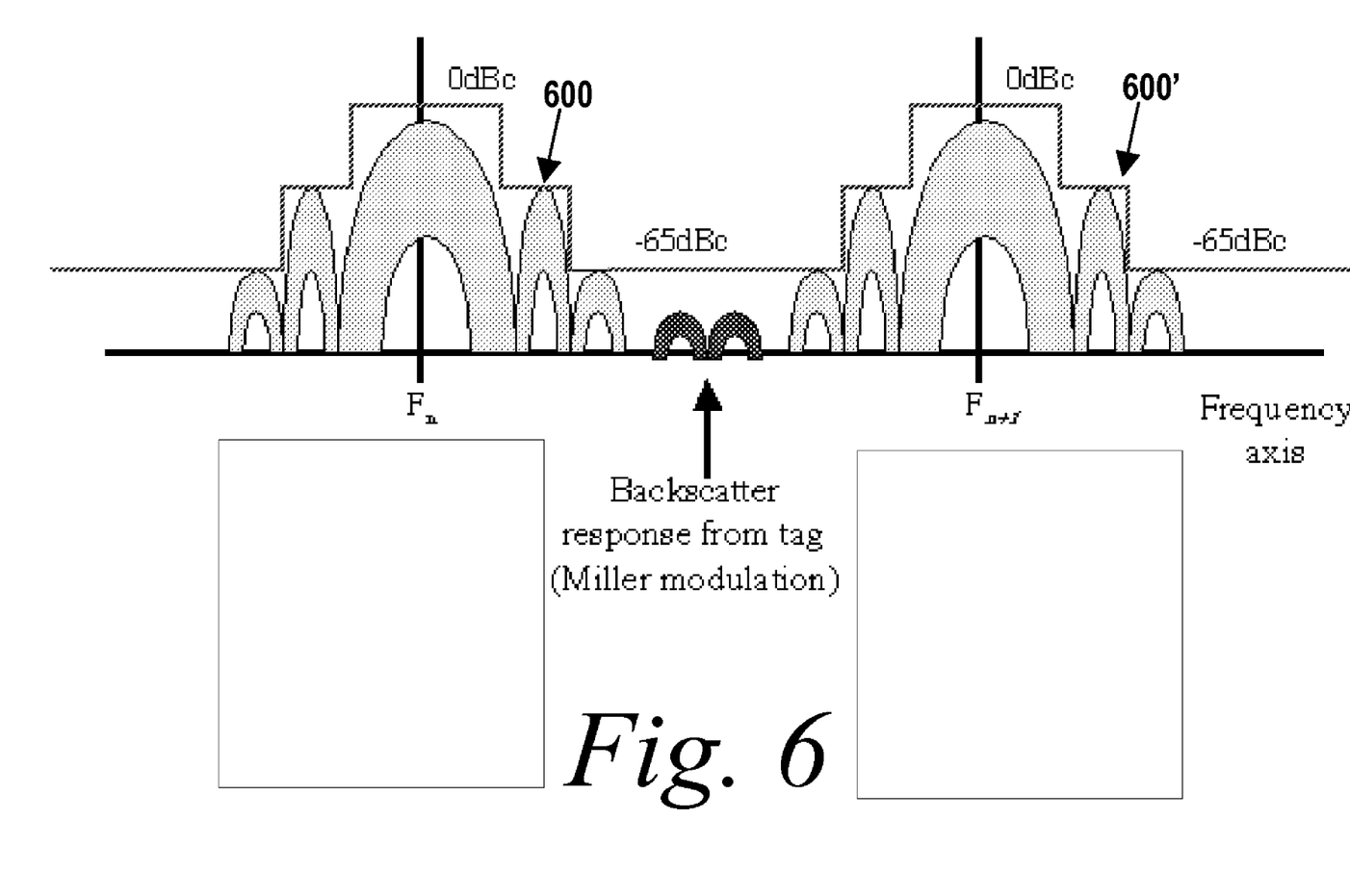
FIG. 6 depicts block diagrams of an embodiment of a pair of transmission masks.

In another embodiment, the equalization factors are determined using an emission mask associated with the second RFID tag reader system. With reference to FIG. 6, an embodiment of an emission mask 600 for the first RFID tag reader system 100 and an emission mask 600' for the second RFID tag reader system 100' are shown. A response signal from RFID tags is shown centered in the frequency band between the maxima of the two emission masks, although this depends on the RFID protocol, modulation type, and data rate being employed. Although shown in FIG. 6 as being substantially similar, in other embodiments the emission masks can be different. In one embodiment, the emission masks are defined by a radio frequency identification protocol. In that embodiment, different radio frequency identification protocols may employ different modulation types or rates and therefore have different emission masks. In another embodiment, the emission masks are measured over the air by sampling the incoming noise signal and performing a peak finding operation on that sampled signal. In one embodiment the marker frequencies or equalization factors are determined by selecting the frequency regions of the emission mask that contain the most energy in the desired tag response band.

Referring back to FIG. 5, in other embodiments the equalization coefficients are determined using ratiometric comparisons of the response signals received by an antenna element 104 and the noise-plus-interference signals received by the sense antenna 116. In one embodiment, the ratiometric comparison is performed in the time domain. In another embodiment, the ratiometric comparison is performed in the frequency domain. Generally, the equalization factors are determined in an effort to automatically match the magnitude and phase response of the main receiver and sense receiver systems. This can be advantageous when there are differences between the main receiver and sense receiver systems, such as when component tolerances in the two receivers result in different gain or phase responses. In some embodiments, the sense receiver is deliberately designed to have reduced gain or unknown phase in order to minimize the cost or complexity of the sense receiver.

After calculating (STEP 550) equalization factors, the processing circuitry 108 applies (STEP 560) the equalization factors to the received response signals to increase the tag responses. Said another way, one objective is to improve the signal-to-noise-plus-interference ratio for the received tag signals by subtracting some of the correlated noise (i.e., noise received by both in the main antenna 104 and sense antenna 116) while the tag returned power level is substantially unaltered. In one embodiment, the equalization factors are used by a noise cancellation algorithm. As previously described, various noise cancellation algorithms can be used. In one embodiment, the noise cancellation algorithm subtracts the equalized, sampled noise from the sampled response signals.

Figure 7:
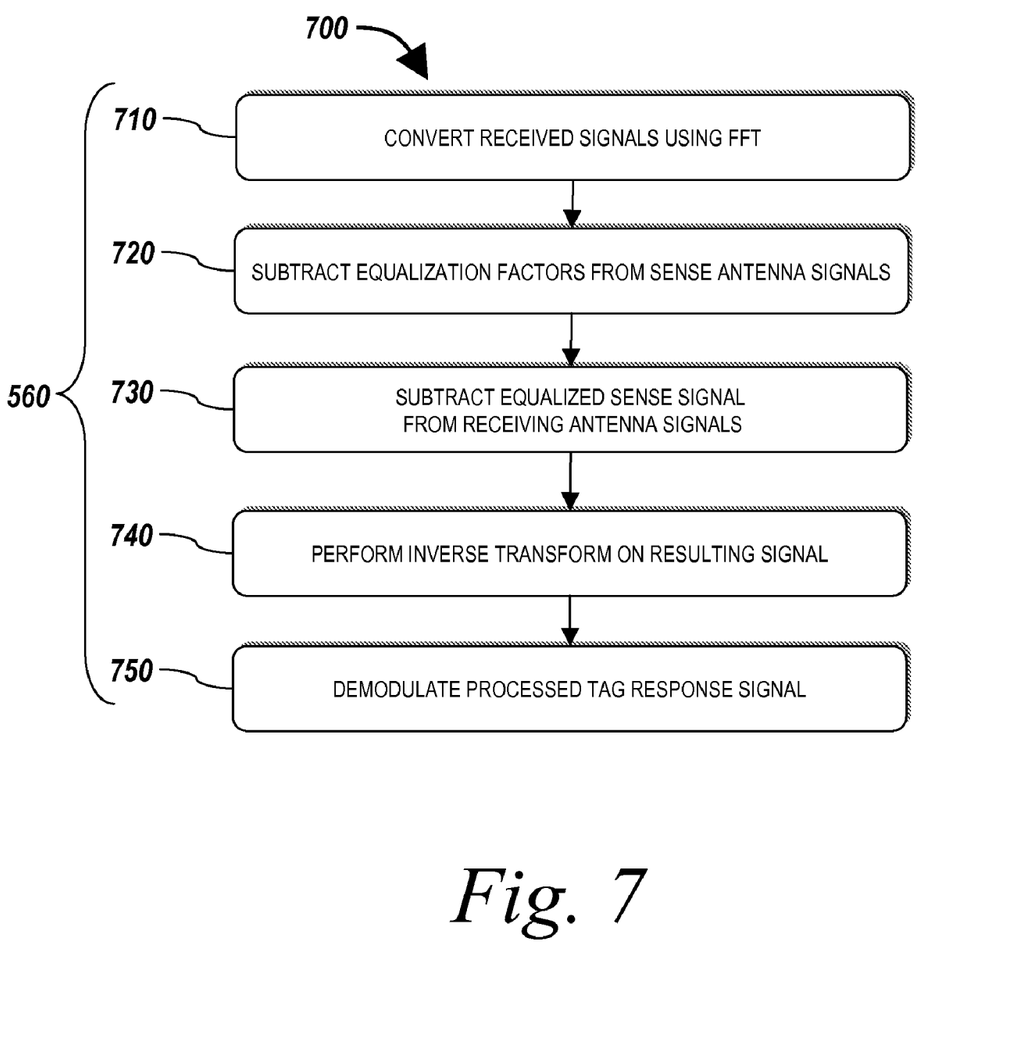
FIG. 7 depicts a flow chart of an embodiment of a method of processing received tag response and noise-plus-interference signals.

In one embodiment, processing circuitry applies (STEP 560) the equalization factors in the frequency domain. With reference to FIG. 7, a method 700 of applying the equalization factors is described. Conceptually, the method 700 can be thought of as a Fourier transform processing method. The method includes converting (STEP 710) the received signals from both the sense antenna 116 and receiving antenna 104, subtracting (STEP 720) the equalization factors from the transformed sense antenna signal, and subtracting (STEP 730) the equalized sense antenna signal from receiving antenna signal. The method 700 also includes performing (STEP 740) an inverse transform on the processed receiving antenna signal and demodulating (STEP 750) the processed receiving antenna signal.

In one embodiment, the processing circuitry 108 receives the incoming signals from the main receiving antenna 104 and sense antenna 116 and converts them to a digital form for which (STEP 710) their FFTs are taken continuously In other embodiments, other time-to-frequency domain conversion techniques can be used.

In one embodiment, the processing circuitry 108 subtracts (STEP 720) the equalization factors from each sense antenna bin. In one embodiment, the subtraction is a performed by vector subtraction. In another embodiment, the subtractions are actually performed by vector multiplication. The subtraction results in an equalized sense antenna data.

In one embodiment, the processing circuitry 108 subtracts (STEP 730) the equalized sense antenna data from the main antenna FFT bin. In one embodiment, the subtraction is a performed by vector subtraction. In another embodiment, the subtractions are actually performed by vector multiplication. The subtraction results in tag response data in which the noise components are substantially reduced.

In one embodiment, the processing circuitry 108 performs (STEP 740) an inverse-Fourier transform on the equalized response data. In other embodiments, other frequency-to-time domain transforms are used. The reverse transformation results in a time domain signal that includes the tag response.

In one embodiment, the processing circuitry 108 demodulates (STEP 750) the time domain signal using known demodulation techniques. This described method 700 becomes more processor intense as the number of marker frequency bins is increased due to the increased number of mathematical operations that must be performed.

Figure 8:
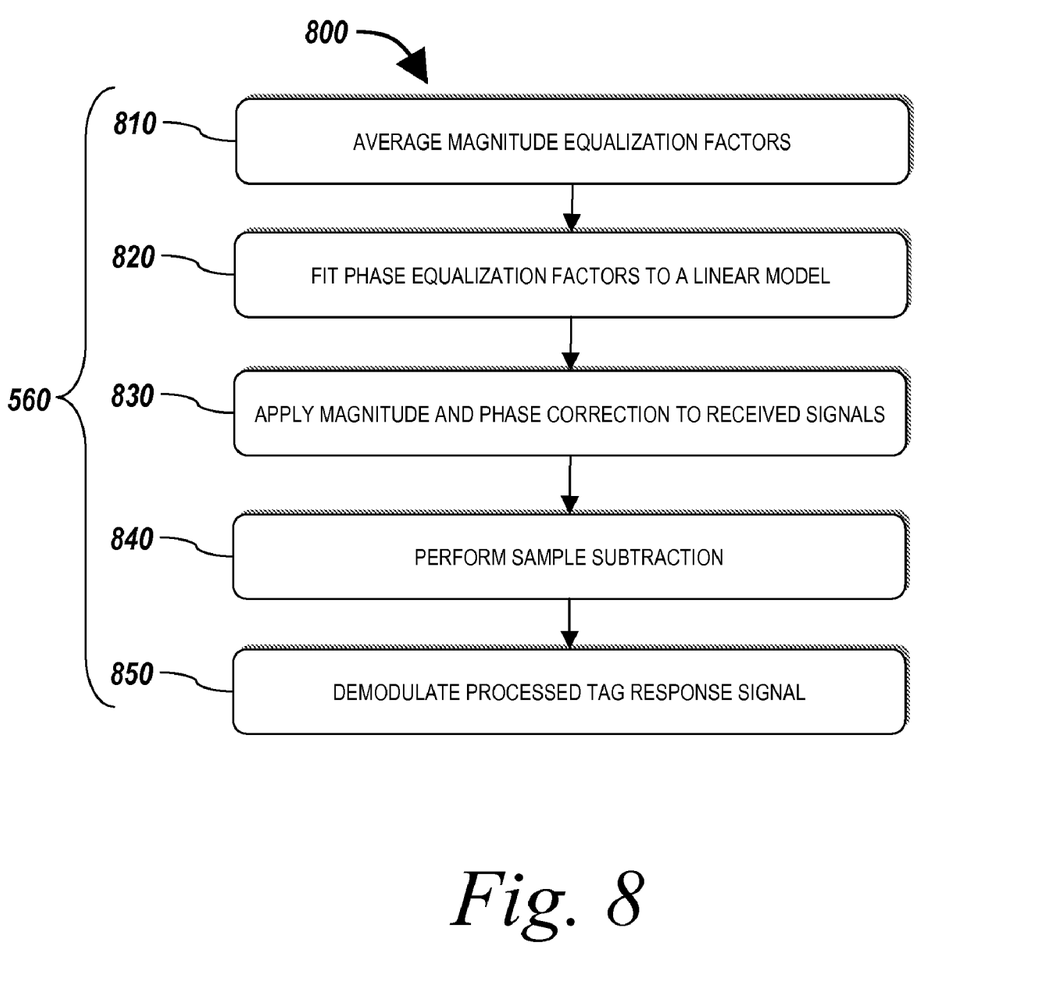
FIG. 8 depicts a flow chart of another embodiment of a method of processing received tag response and noise-plus-interference signals.

Referring back to FIG. 5, in one embodiment, processing circuitry applies (STEP 560) the equalization factors in the time domain. With reference to FIG. 8, a method 800 of applying the equalization factors is described. In one embodiment, the method 800 includes averaging (STEP 810) the magnitude equalization factors, fitting (STEP 820) the phase equalization factors to a linear model, and applying (STEP 830) the resulting magnitude and phase correction to the received signals. The method also includes performing (STEP 840) sample subtraction and demodulating (STEP 850) the processed tag response signals.

In one embodiment, the processing circuitry 108 averages (STEP 810) the magnitude equalization factors using a moving average technique. In another embodiment, a weighted average is used. It should be understood that other averaging techniques can also be applied. The averaging (STEP 810) results in a gain calibration factor for the sense antenna 116.

In one embodiment, the processing circuitry 108 fits (STEP 820) the phase equalization factors to a linear model and the slope of the line is used to determine the best sample cycle offset (e.g., correlation offset) between the sense antenna data and the main antenna data. Various known fit to linear model techniques can be used (e.g., the general linear model). A nonlinear model may also be employed at the expense of additional processor loading.

In one embodiment, the processing circuitry 108 applies (STEP 830) the resulting magnitude and phase corrections to the sense antenna data in the time domain. This can be done, for example, by multiplying each sense antenna data sample by the magnitude equalization factor and delaying the sense antenna dataset by the correlation offset. The application of the correction data results in an equalized sense data set.

In one embodiment, the processing circuitry 108 performs (STEP 840) sample subtraction. That is, the equalized sense data set is subtracted from the received tag response signal data. In one embodiment, the resulting data set resultant data follows the following formula: $P_n = M_n - (CM_{average} * S(n-delay))$.

In one embodiment, the processing circuitry 108 demodulates (STEP 850) the resultant data set $P_1 \ldots P_n$. In one embodiment, the samples are communicated to a tag signal demodulation algorithm. It should be understood that various demodulation algorithms can be used.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method of increasing the signal-to-noise-plus-interference ratio of a radio frequency tag response, the method comprising:
   receiving, with a first antenna element of a radio frequency tag reader, a radio frequency tag response, the radio frequency tag response including at least two signals, a noise-plus-interference signal and a response signal, the ratio of the response signal to the noise-plus-interference signal representing the signal-to-noise-plus-interference ratio of the received radio frequency tag response;
   receiving a second noise-plus-interference signal with a second antenna element of the radio frequency tag reader; and
   processing the received radio frequency tag response and the second noise-plus-interference signal to increase the signal-to-noise-plus-interference ratio of the received radio frequency tag response by reducing the noise-plus-interference signal of the received radio frequency tag response using the second noise-plus-interference signal.

2. The method of claim 1 further comprising equalizing the second noise-plus-interference signal to generate a normalized noise-plus-interference signal response prior to processing the received radio frequency tag response.

3. The method of claim 2 wherein the equalizing comprises equalizing the second noise-plus-interference signal in the frequency domain.

4. The method of claim 2 wherein the equalizing comprises equalizing the second noise-plus-interference signal in the time domain.

5. The method of claim 2 wherein the equalizing is performed on a periodic basis.

6. The method of claim 1 wherein the receiving the second noise-plus-interference signal further comprises receiving the second noise-plus-interference signal with a second antenna element comprising an antenna element of the radio frequency tag reader switchably connected with dedicated noise-plus-interference reception circuitry or radio frequency tag response reception circuitry.

7. The method of claim 1 wherein the receiving the second noise-plus-interference signal further comprises receiving the second noise-plus-interference signal with a second antenna element comprising an antenna element of the radio frequency tag reader permanently connected to reception circuitry that may be used either for noise-plus-interference reception or radio frequency tag response reception.

8. The method of claim 1 wherein the receiving the second noise-plus-interference signal further comprises digitizing a quadrature downconverted input signal.

9. The method of claim 1 wherein the second noise-plus-interference signal comprises primarily backscatter noise produced by time varying reflections in the environment.

10. The method of claim 1 wherein the second noise-plus-interference signal comprises primarily interfering signals transmitted by a second radio frequency tag reader.

11. The method of claim 10 wherein the equalizing comprises incorporating at least one of frequency, amplitude, and phase characteristics derived from the second radio frequency tag reader's transmitted emission mask.

12. The method of claim 11 wherein the second radio frequency tag reader's transmitted emission mask is specified by a radio frequency identification protocol.

13. The method of claim 11 wherein the second radio frequency tag reader's transmitted emission mask is measured over the air.

14. The method of claim 1 wherein the processing is performed preferentially over the bandwidth of the radio frequency tag response.

15. The method of claim 9 wherein the second noise-plus-interference signal comprises primarily backscatter noise produced by fluorescent lights.

16. The method of claim 2 wherein the processing further comprises multiplication of a vector containing equalization coefficients by a vector containing complex frequency bins of a Fourier transform.

17. The method of claim 2 wherein the processing comprises vector subtraction of complex frequency bins of a Fourier transform of the noise-plus-interference signal from the complex frequency bins of a Fourier transform of the received radio frequency tag response.

18. The method of claim 16 wherein the equalization coefficients are determined by ratiometric comparison of the signals from the first antenna element and the second antenna element in the time domain.

19. The method of claim 16 wherein the equalization coefficients are determined by ratiometric comparison of the signals from the first antenna element and the second antenna element in the frequency domain.

20. A radio frequency tag reading system employing noise-plus-interference cancellation, the system comprising:
a radio frequency tag reader having a plurality of antenna elements, a first one of the antenna elements receiving a radio frequency tag response, the radio frequency tag response including at least two signals, a noise-plus-interference signal and a response signal, the ratio of the response signal to the noise-plus-interference signal representing the signal-to-noise-plus-interference ratio of the received radio frequency tag response, and a second one of the antenna elements receiving a second noise-plus-interference signal; and
processing circuitry in communication with the radio frequency tag reader, the processing circuitry processing the received radio frequency tag response and the second noise-plus-interference signal to increase the signal-to-noise-plus-interference ratio of the received radio frequency tag response by reducing the noise-plus-interference signal of the received radio frequency tag response using the second noise-plus-interference signal.

21. The system of claim 20 wherein the processing circuitry resides in a housing of the radio frequency tag reader.

22. The system of claim 20 wherein the processing circuitry comprises radio frequency tag response reception circuitry and dedicated noise-plus-interference reception circuitry.

23. The system of claim 22 wherein the second one of the antenna elements is switchably connected to the dedicated noise-plus-interference reception circuitry or radio frequency tag response reception circuitry.

24. The system of claim 22 wherein the second one of the antenna elements is permanently connected to reception circuitry that may be used for either noise-plus-interference reception or radio frequency tag response reception.

25. The system of claim 20 wherein the processing circuitry further comprises digital signal processing circuitry configured to equalize the received noise-plus-interference signal.

26. The system of claim 25 wherein the digital signal processing circuitry is configured to equalize the received noise-plus-interference signal on a periodic basis.

27. The system of claim 25 wherein the digital signal processing circuitry is configured to equalize the second noise-plus-interference signal in the frequency domain.

28. The system of claim 25 wherein the digital signal processing circuitry is configured to equalize the second noise-plus-interference signal in the time domain.

29. The system of claim 20 wherein the first antenna element comprises at least one element of an array of antenna elements.

30. The system of claim 20 wherein the antenna element comprises a radiation pattern produced by a phased array antenna.

31. The system of claim 20 wherein both the first antenna element and the second antenna element are produced by the same phased array antenna.

32. A radio frequency tag reading system having noise-plus-interference cancellation, the system comprising:
means for receiving a radio frequency tag response, the radio frequency tag response including at least two signals, a noise-plus-interference signal and a response signal, the ratio of the response signal to the noise-plus-interference signal representing the signal-to-noise-plus-interference ratio of the received radio frequency tag response;
means for receiving a second noise-plus-interference signal; and
means for processing the received radio frequency tag response and the second noise-plus-interference signal to increase the signal-to-noise-plus-interference ratio of the received radio frequency tag response by reducing the noise-plus-interference signal of the received radio frequency tag response using the second noise-plus-interference signal.

33. The system of claim 32 further comprising means for equalizing the second noise-plus-interference signal to generate a normalized noise-plus-interference signal response prior to processing the received radio frequency tag response.

34. The system of claim 33 wherein the means for equalizing comprises means for equalizing the second noise-plus-interference signal in the frequency domain.

35. The system of claim 33 wherein the means for equalizing comprises means for equalizing the second noise-plus-interference signal in the time domain.

36. The system of claim 33 wherein the means for equalizing is configured to operate on a periodic basis.

37. The system of claim 32 wherein the means for receiving the second noise-plus-interference signal is switchably connected to dedicated noise-plus-interference reception circuitry or radio frequency tag response reception circuitry.

38. The system of claim 32 wherein the means for receiving the second noise-plus-interference signal is permanently connected to dedicated noise-plus-interference reception circuitry.

* * * * *